United States Patent
Cha et al.

(10) Patent No.: US 8,130,442 B2
(45) Date of Patent: Mar. 6, 2012

(54) OPTICAL AMPLIFYING MEDIUM, METHOD OF MANUFACTURING THE OPTICAL AMPLIFYING MEDIUM, AND OPTICAL DEVICE COMPRISING THE OPTICAL AMPLIFYING MEDIUM

(75) Inventors: Dae-kil Cha, Seoul (KR); Jung-hoon Shin, Daejeon (KR); Yoon-dong Park, Yongin-si (KR); Young-gu Jin, Hwaseong-si (KR); Moon-seung Yang, Hwaseong-si (KR); In-sung Joe, Seoul (KR); Jee-soo Chang, Daejeon (KR)

(73) Assignees: Samsung Electronics Co., Ltd., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 755 days.

(21) Appl. No.: 12/230,937

(22) Filed: Sep. 8, 2008

(65) Prior Publication Data
US 2009/0284830 A1  Nov. 19, 2009

(30) Foreign Application Priority Data
May 16, 2008 (KR) ........................ 10-2008-0045521

(51) Int. Cl.
*H01S 3/00* (2006.01)
(52) U.S. Cl. ........................................ 359/342; 359/344
(58) Field of Classification Search .................. 359/344, 359/333, 342
See application file for complete search history.

(56) References Cited

U.S. PATENT DOCUMENTS

| | | | |
|---|---|---|---|
| 2005/0077526 A1* | 4/2005 | Shin et al. | 257/79 |
| 2005/0122569 A1* | 6/2005 | Shin et al. | 359/333 |
| 2006/0012853 A1* | 1/2006 | Tallone et al. | 359/333 |
| 2008/0226903 A1* | 9/2008 | Mishra | 428/336 |
| 2010/0034232 A1* | 2/2010 | Gourbilleau et al. | 372/50.11 |
| 2010/0091358 A1* | 4/2010 | Kimerling et al. | 359/344 |

* cited by examiner

*Primary Examiner* — Mark Hellner
(74) *Attorney, Agent, or Firm* — Harness, Dickey & Pierce, P.L.C.

(57) ABSTRACT

An optical amplifying medium, a method of manufacturing the optical amplifying medium are provided, and an optical device comprising the optical amplifying medium. The optical amplifying medium includes a multi-layer structure in which a first material layer doped with an activator and a second material layer that comprises a sensitizer are stacked.

22 Claims, 6 Drawing Sheets

OPTICAL AMPLIFYING MEDIUM, METHOD OF MANUFACTURING THE OPTICAL AMPLIFYING MEDIUM, AND OPTICAL DEVICE COMPRISING THE OPTICAL AMPLIFYING MEDIUM

CROSS-REFERENCE TO RELATED PATENT APPLICATION

This application claims the benefit of Korean Patent Application No. 10-2008-0045521, filed on May 16, 2008, in the Korean Intellectual Property Office, the disclosure of which is incorporated herein in its entirety by reference.

BACKGROUND

1. Field of the Invention

The present invention relates to an optical device, and more particularly, to an optical amplifying medium, a method of manufacturing the optical amplifying medium, and an optical device comprising the optical amplifying medium.

2. Description of the Related Art

When an optical signal is transmitted, an optical amplifier is used to compensate for its quality degradation caused by signal attenuation or wave distortion. The optical amplifier directly amplifies the optical signal without the need of transforming the optical signal to an electrical signal. Also, the optical amplifier can simultaneously amplify a series of wavelengths, and thus, is suitable for dense wavelength division multiplexing (DWDM).

An example of an optical amplifier is an erbium-doped optical fiber amplifier (EDFA). A conventional optical fiber amplifier includes a pumping light source for exciting erbium ions of the erbium-doped fiber (EDF) and an optical isolator for blocking a reverse progress of an optical signal. However, the EDF, that is, $SiO_2$ doped with erbium, can be pumped only by a pumping light source that emits light having a wavelength (980 nm or 1480 nm) that can be absorbed by erbium, and such pumping light source is generally large and expensive. Thus, the conventional EDFA can hardly be miniaturized, and thus, the manufacturing costs thereof can hardly be reduced.

In order to address the problems of the conventional EDFA, a method of including Si nano-clusters, which are a sensitizer, in $SiO_2$ doped with erbium has been disclosed. That is, SiOx (where x<2), in which erbium ion, which is an activator, and Si nano-clusters, which are a sensitizer, are included in $SiO_2$, which is a host, is used as an amplifying medium. In this case, since the Si nano-clusters increase the efficiency of energy transfer from the host to the activator, a small light source such as a light emitting diode (LED) having a wide wavelength can be used as a pumping light source.

However, in order to form the Si nano-clusters, a high temperature annealing process is required. In a high temperature annealing, the interconnection of erbium and the Si nano-clusters can be broken and erbium ions can cluster, and thus, an optical loss can occur.

SUMMARY

To address the above and/or other problems, the present invention provides an optical amplifying medium and a method of manufacturing the optical amplifying medium.

The present invention also provides an optical device comprising the optical amplifying medium.

According to an aspect of the present invention, there is provided an optical amplifying medium comprising a multi-layer structure in which a first material layer doped with an activator and a second material layer that comprises a sensitizer are stacked.

The activator may be erbium.

The sensitizer may be Si nano-clusters.

The first material layer may be a silicon nitride layer. In this case, the second material layer may be a silicon oxide layer or a silicon nitride layer.

The first material layer may be a silicon oxide layer. In this case, the second material layer may be a silicon nitride layer.

The first material layer and the second material layer may be alternately and repeatedly stacked.

The first material layer and the second material layer respectively may have thicknesses of 10 nm or less.

According to an aspect of the present invention, there is provided a method of manufacturing an optical amplifying medium comprising: forming a multi-player structure that comprises a first layer doped with an activator and a second layer having a non-stoichiometric composition on a substrate; and annealing the substrate so that a sensitizer is formed in the second layer.

The activator may be erbium.

The sensitizer may be Si nano-clusters.

The first layer may be formed of a silicon nitride. In this case, the second layer may be formed of a silicon-rich silicon nitride or a silicon-rich silicon oxide.

The first layer may be formed of a silicon oxide. In this case, the second layer may be formed of a silicon-rich silicon nitride.

The first layer and the second layer may be alternately and repeatedly stacked.

The first layer and the second layer respectively may have thicknesses of 10 nm or less.

According to an aspect of the present invention, there is provided an optical device comprising: an optical amplifying medium described above; and a pumping light source for irradiating pumping light onto the optical amplifying medium.

The optical device may be an optical amplifier.

The optical device may further comprise a cavity structure for resonating light, and the optical amplifying medium may be included in the cavity structure. In this case, the optical device may be a light source.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
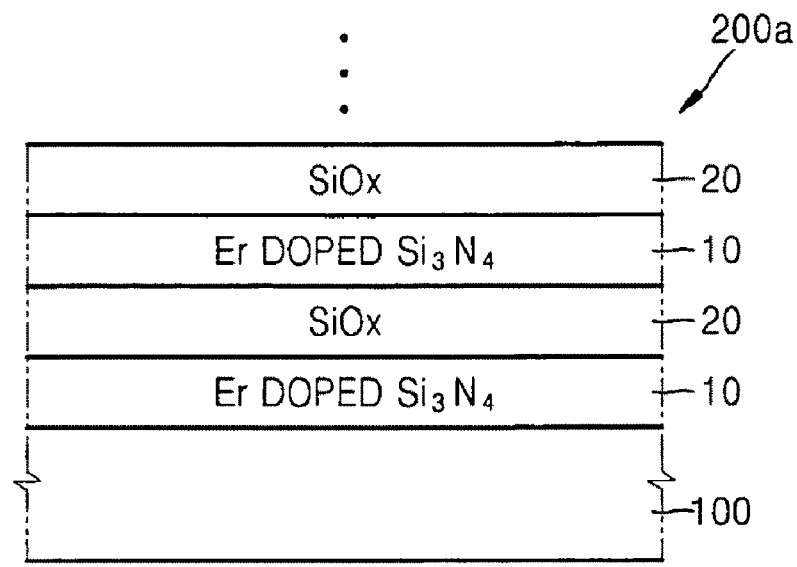
FIGS. 1 through 3 are cross-sectional views of optical amplifying media according to embodiments of the present invention.

The present invention will now be described more fully with reference to the accompanying drawings in which exemplary embodiments of the invention are shown. In the drawings, the thicknesses of layers and regions are exaggerated for clarity, and like reference numerals refer to the like elements.

FIG. 1 is a cross-sectional view of an optical amplifying medium 200a according to an embodiment of the present invention.

Referring to FIG. 1, the optical amplifying medium 200a may include a first material layer 10 and a second material layer 20, which are alternately stacked on a substrate 100. The substrate 100 may be, for example, a single crystal Si substrate, and may have (100) crystal plane. However, the material and the crystal structure of the substrate 100 are not limited thereto. For instance, the substrate 100 may be a SOI (silicon on insulator) substrate. The first material layer 10 may include $Si_3N_4$ as a host and a rare earth element, for example, Erbium (Er), as an activator. That is, the first material layer 10 may be a $Si_3N_4$ layer doped with Er. The second material layer 20 may be a silicon oxide layer that includes Si nano-clusters as a sensitizer. That is, the second material layer 20 may include a $SiO_2$ layer and a plurality of Si nano-clusters dispersed in the $SiO_2$ layer. In this case, the second material layer 20 may be expressed as a Si rich silicon oxide layer, that is, a SiOx (where, x<2) layer.

Figure 2:
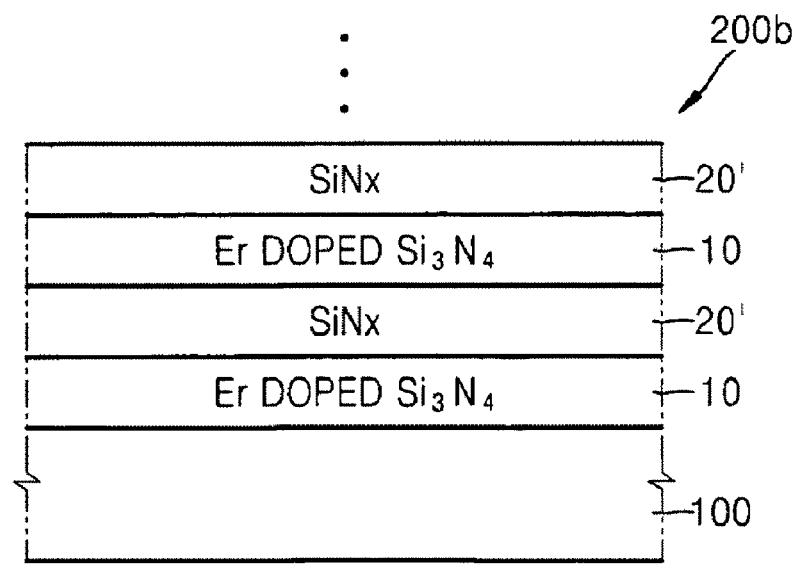

FIG. 2 is a cross-sectional view of an optical amplifying medium 200b according to another embodiment of the present invention. The optical amplifying medium 200b is a modified version of the optical amplifying medium 200a of FIG. 1.

Referring to FIG. 2, a second material layer 20' may be a silicon nitride layer that includes a plurality of Si nano-clusters as a sensitizer. In this case, the second material layer 20' may be expressed as a Si rich silicon nitride layer, that is, a SiNx (where, x<4/3) layer. The optical amplifying medium 200b of FIG. 2 may have the same configuration as the optical amplifying medium 200a of FIG. 1, except for the material used to form the second material layer 20'.

Figure 3:
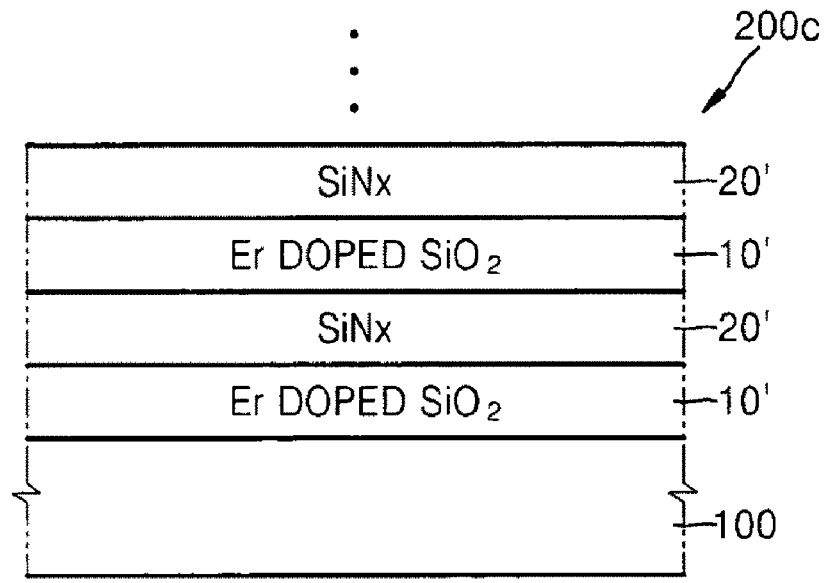

FIG. 3 is a cross-sectional view of an optical amplifying medium 200c according to another embodiment of the present invention. The optical amplifying medium 200c is a modified version of the optical amplifying medium 200b of FIG. 2.

Referring to FIG. 3, a first material layer 10' may include a silicon oxide $SiO_2$ as a host and Er as an activator. The optical amplifying medium 200c of FIG. 3 may have the same configuration as the optical amplifying medium 200b of FIG. 2, except for the material used to form the first material layer 10'.

In FIGS. 1 through 3, the first material layers 10 and 10' and the second material layers 20 and 20' respectively may have thicknesses of 10 nm or less, for example, 5 nm or less. The first material layers 10 and 10' and the second material layers 20 and 20' may have the same thickness or different thicknesses. In this way, when the thicknesses of the first material layers 10 and 10' and the second material layers 20 and 20' are a few nm, the energy transfer to the first material layers 10 and 10' can be easy due to the sensitizers, that is, the Si nano-clusters of the second material layers 20 and 20'. The number of first material layers 10 and 10' and the number of second material layers 20 and 20' respectively may be a few to a few tens.

As described above, in the optical amplifying media 200a through 200c according to the embodiments of the present invention, Er (activator) and the Si nano-clusters (sensitizer) are present in different layers. Thus, in a manufacturing process of the optical amplifying media 200a through 200c, an undesired reaction between Er and the Si nano-clusters, that is, a reaction in which the interconnection there between is broken can be prevented or minimized. Also, in the case of the first material layer 10 of FIGS. 1 and 2, which includes $Si_3N_4$ as a host, the clusterization of Er can be prevented or minimized since the diffusion of Er into the $Si_3N_4$ is repressed. Thus, according to the embodiments of the present invention, an optical amplifying medium having a high optical gain can be realized.

Figure 4:
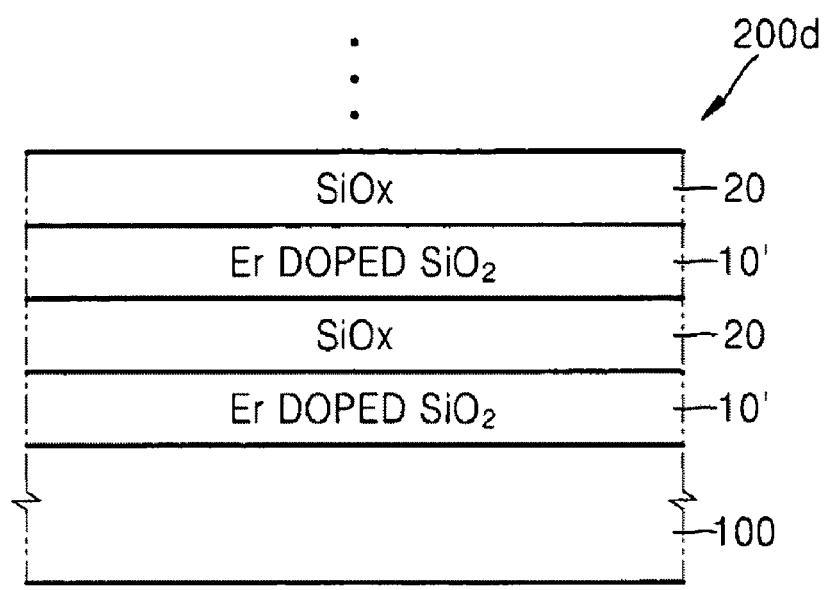
FIG. 4 is a cross-sectional view of an optical amplifying medium according to a comparative example for comparing with the embodiments of the present invention.

FIG. 4 is a cross-sectional view of an optical amplifying medium 200d according to a comparative example for comparing with the embodiments of the present invention.

Referring to FIG. 4, the first material layer 10' of FIG. 3 and the second material layer 20 of FIG. 1 are alternately stacked on the substrate 100.

Although it will be described later in detail, the optical amplifying media 200a through 200d can be formed by annealing a substrate so that the sensitizer can be formed in a second layer after alternately forming a first layer doped with an activator and the second material layer having a non-stoichiometric composition on the substrate. Here, after annealing, the first layer and the second layer respectively correspond to the first material layers 10 and 10' and the second material layers 20 and 20' of FIGS. 1 through 4.

Figure 5:
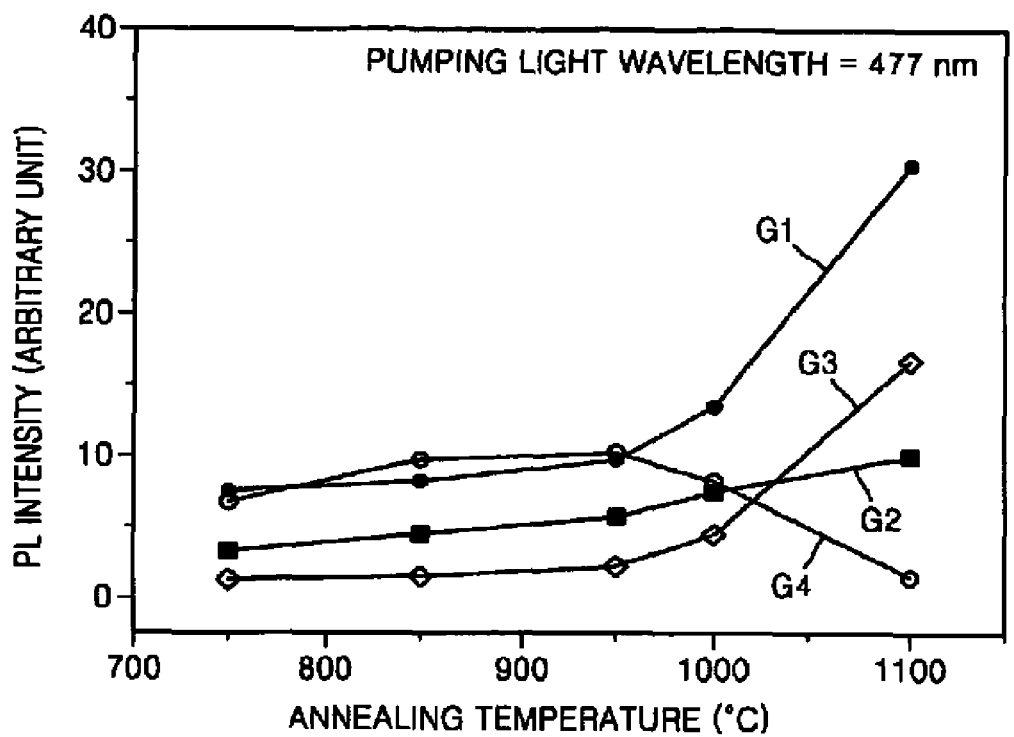
FIGS. 5 and 6 are graphs showing the variation of intensity of photoluminescence (PL) of erbium according to annealing temperature of the optical amplifying media of FIGS. 1 through 4.

FIG. 5 is a graph showing the variation of intensity of photoluminescence (PL) of Er according to annealing temperature of the optical amplifying media 200a through 200d of FIGS. 1 through 4. A pumping light source used to obtain the result of FIG. 5 has a wavelength of 477 nm. When such a pumping light source is used, PL is mainly generated due to energy transfer of Si nano-clusters, which is a sensitizer. The first through fourth graphs G1 through G4 of FIG. 5 respectively are results corresponding to the optical amplifying media 200a through 200d of FIGS. 1 through 4.

Referring to FIG. 5, in the case of first through third graphs G1 through G3, which are results corresponding to the optical amplifying media 200a through 200c according to the embodiments of the present invention, it is seen that, as the annealing temperature increases, the intensities of PL increase. In particular, when the annealing temperature increases to approximately 1,000° C. or above, the first and third graphs G1 and G3 depict that the intensities of PL are remarkably increased. Meanwhile, in the case of the fourth graph G4, which is a result corresponding to the optical amplifying medium 200d according to the comparative example, as the annealing temperature increases to approximately 950° C. or above, the intensity of PL is reduced.

Figure 6:
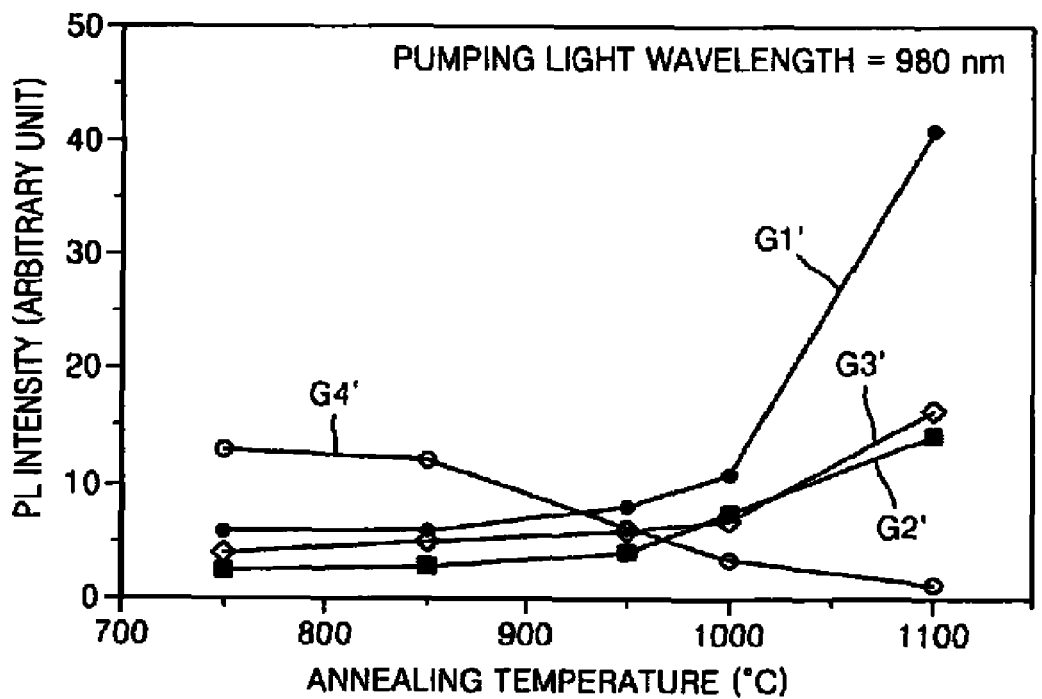

FIG. 6 is a graph showing the variation of intensity of PL of Er according to annealing temperature of the optical amplifying media 200a through 200d of FIGS. 1 through 4. For this measurement, a pumping light source having a wavelength of 980 nm was used. When the pumping light source having a wavelength of 980 nm is used, Er can be directly excited due to the pumping light source, and accordingly, a PL phenomenon by the excitation of Er mainly occurs. In FIG. 6, first through fourth graphs G1' through G4' are respectively results corresponding to the optical amplifying media 200a through 200d of FIGS. 1 through 4.

Referring to FIG. 6, the first through fourth graphs G1' through G4' have a similar trend as the first through fourth graphs G1 through G4 of FIG. 5. That is, in the case of the first through third graphs G1' through G3' which are results corresponding to the optical amplifying media 200a through 200c according to the embodiments of the present invention, as the annealing temperature increases, the intensities of PL increase. In particular, when the annealing temperature increases to approximately 1,000° C. or above, the intensities of PL are remarkably increased. Meanwhile, in the case of the fourth graph G4' which is a result corresponding to the optical amplifying medium 200d according to the comparative example, as the annealing temperature increases to approximately 850° C. or above, the intensity of PL is reduced.

From the results of FIGS. 5 and 6, in the case of the optical amplifying media 200a through 200c formed according to the embodiments of the present invention, even if the annealing temperature increases to approximately 1,000° C. or above during the manufacturing process, the intensities of PL are not reduced but increased. This denotes that, although the annealing temperature increases to 1000° C. or above, an undesired reaction between Er and Si nano-clusters or a clusterization of Er does not occur, however, Er and the Si nano-clusters instead form a structure that is advantageous for obtaining a high optical gain. In particular, the first graph G1 of FIG. 5 and the first graph G1' of FIG. 6, which are the results corresponding to the optical amplifying medium 200a, show remarkably large increase in the PL intensities. From this result, it can be seen that, in the case of the optical amplifying media 200a of FIG. 1, that is, when the first material layer 10 is a $Si_3N_4$ layer doped with Er and the second material layer 20 is a SiOx (where, x<2) layer, a very high optical gain can be obtained.

Figure 7:
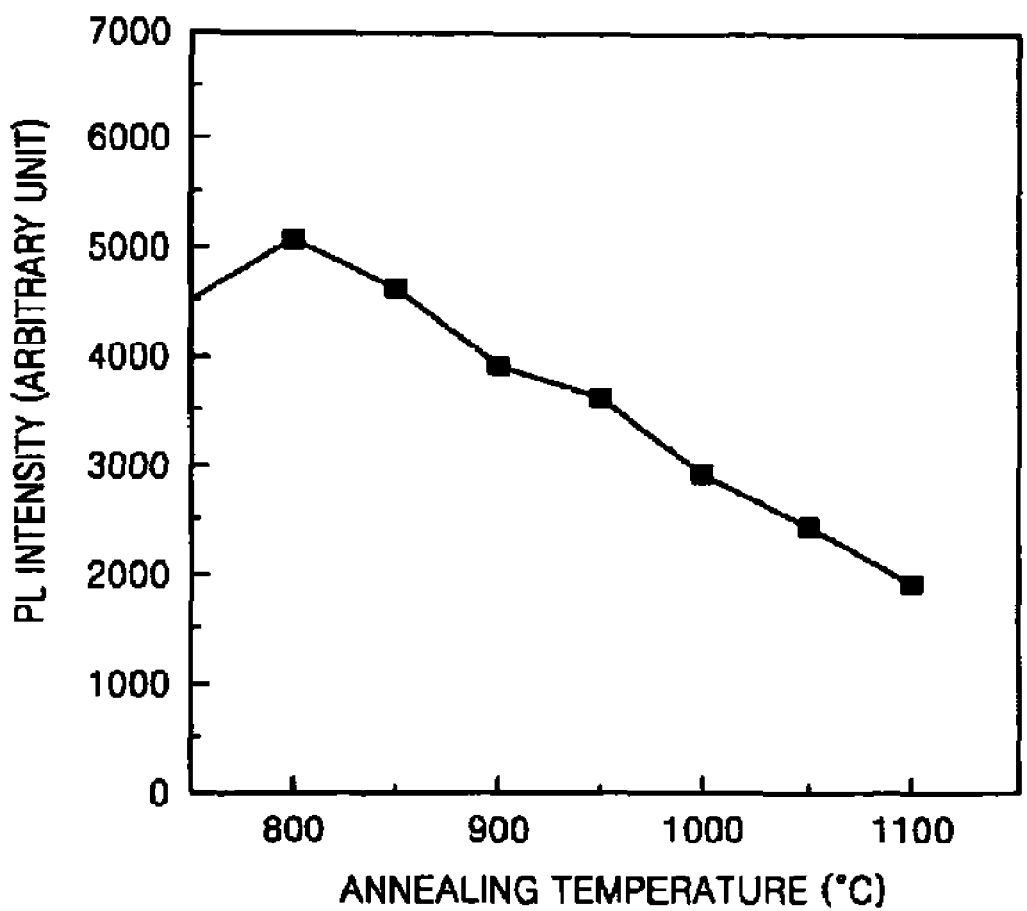
FIG. 7 is a graph showing the variation of intensity of PL of erbium according to annealing temperature of a conventional optical amplifying medium.

FIG. 7 is a graph showing the variation of intensity of PL of Er according to annealing temperature of a conventional optical amplifying medium. The conventional optical amplifying medium has a single layer structure that includes Er as an activator and Si nano-clusters as a sensitizer in a $SiO2$ host, and may be expressed as Er doped SiOx, where x=1.6. Referring to FIG. 7, as the annealing temperature increases to 800° C. or above, the intensity of PL of the conventional optical amplifying medium is greatly reduced.

A method of manufacturing an optical amplifying medium according to an embodiment of the present invention will be briefly described with reference to FIG. 8.

Figure 8:
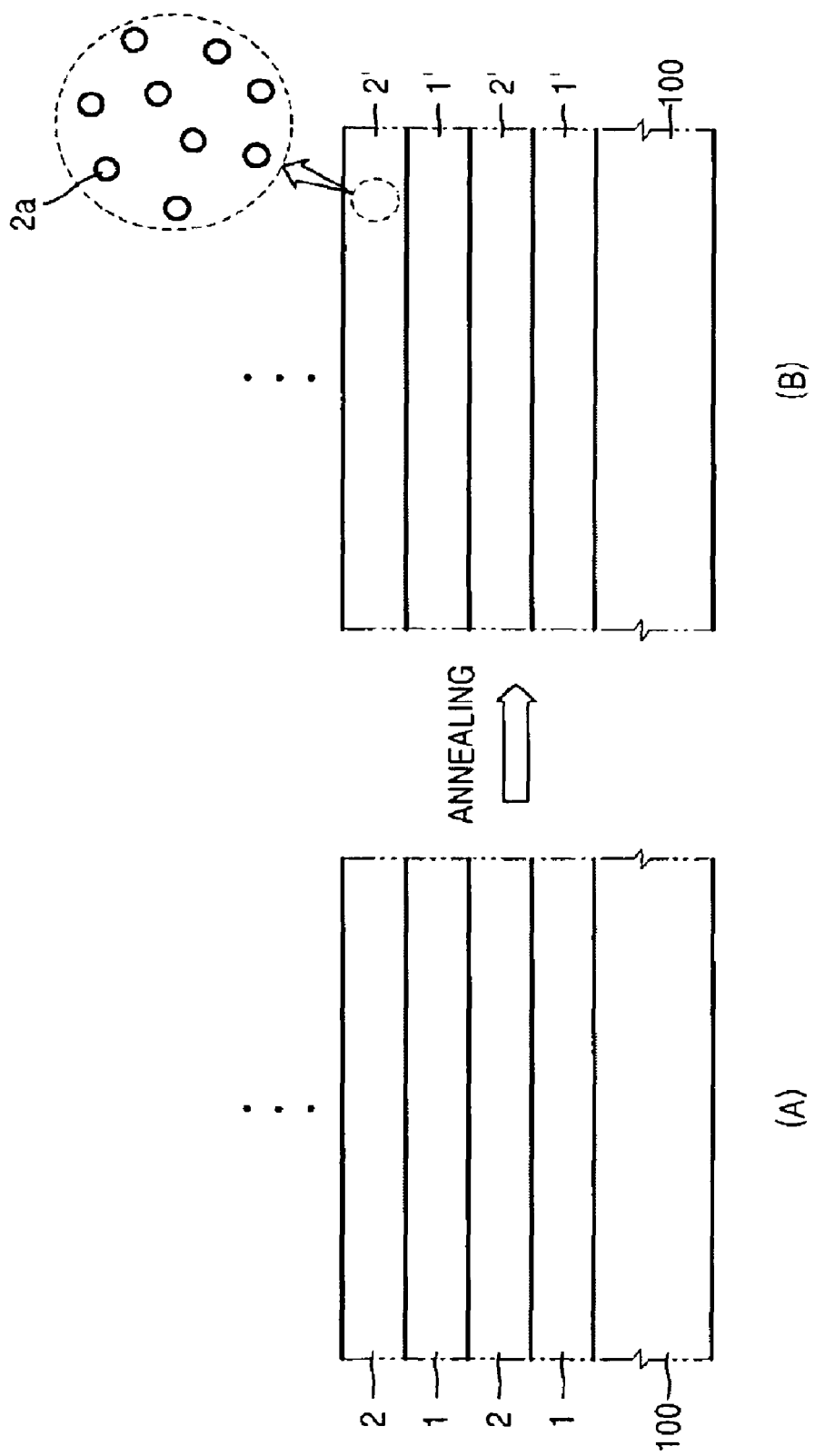
FIG. 8 is a cross-sectional view for explaining a method of manufacturing an optical amplifying medium, according to an embodiment of the present invention.

FIG. 8 is a cross-sectional view for explaining a method of manufacturing an optical amplifying medium, according to an embodiment of the present invention.

Referring to FIG. 8 (A), a first layer 1 and a second layer 2 are alternately deposited on a substrate 100. The first layer 1 may be a $Si_3N_4$ layer doped with an activator or a $SiO_2$ layer doped with an activator, and the activator may be Er. The second layer 2 may be a silicon-rich silicon nitride layer or a silicon-rich silicon oxide layer. If the first layer 1 is formed as a $Si_3N_4$ layer doped with an activator, the second layer 2 may be formed as a silicon-rich silicon nitride layer or a silicon-rich silicon oxide layer. If the first layer 1 is formed as a $SiO_2$ layer doped with an activator, the second layer 2 may be formed as a silicon-rich silicon nitride layer and may not be formed as a silicon-rich silicon oxide layer. The first and second layers 1 and 2 respectively may be formed to a thickness of 10 nm or less, for example, 5 nm or less. The first and second layers 1 and 2 may be deposited using a physical vapor deposition method such as a sputtering method and an evaporation method, and also, may be deposited using other methods, for example, a chemical vapor deposition (CVD) process or an atomic layer deposition (ALD) process.

When the structure of FIG. 8 (A) is annealed, the structure of FIG. 8 (B) can be obtained. The annealing temperature may be 950 to 1,200° C., however, it is simply an example, and thus, the temperature range of annealing may be widened.

Due to the annealing, the clusterization of silicon in the second layer 2 continuous, and as depicted in the magnified view of FIG. 8 (B), Si nano-clusters 2a can be formed as a kind of sensitizer. Reference numerals 1' and 2' of FIG. 8 (B) respectively indicate the first and second layers after annealing, and the first and second layers 1' and 2' respectively can correspond to the first material layers 10 and 10' and the second material layers 20 and 20' of FIGS. 1 through 3.

In this way, the optical amplifying media according to the embodiments of the present invention can be readily manufactured using a conventional semiconductor device manufacturing process. Thus, the optical amplifying media according to the embodiments of the present invention can be readily applied to conventional semiconductor devices, and can be used as chip-to-chip optical interconnectors.

Figure 9:
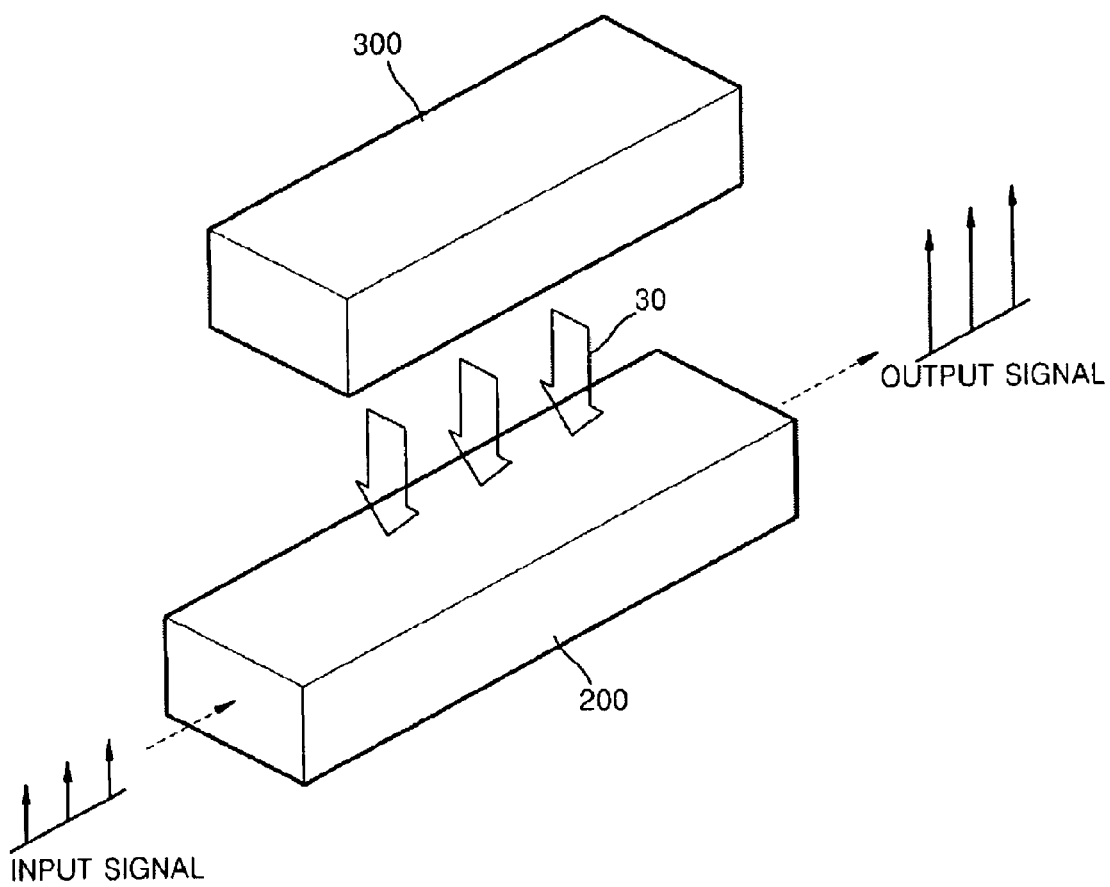
FIG. 9 is a perspective view of an optical device according to an embodiment of the present invention.

FIG. 9 is a perspective view of an optical device according to an embodiment of the present invention.

Referring to FIG. 9, the optical device may be an optical amplifier that includes an optical amplifying medium 200 and a pumping light source 300 for irradiating pumping light 30 onto the optical amplifying medium 200. A signal may be inputted to an end of the optical amplifying medium 200, and may be outputted through the other end of the optical amplifying medium 200 after being amplified in the optical amplifying medium 200. The optical amplifying medium 200 may have the structure of the optical amplifying media 200a through 200c of FIGS. 1 through 3 described above. The activator of the optical amplifying medium 200 can be readily excited by the aid of a sensitizer, and thus, a low-cost, small light source, for example, a light emitting diode (LED), can be used as the pumping light source 300. Thus, according to the present embodiment, a low-cost, small optical amplifier can be realized. In FIG. 9, it is depicted that the pumping light source 300 is formed on the optical amplifying medium 200, however, the positions of the pumping light source 300 and the optical amplifying medium 200 may be changed in various ways.

Although not shown, if the optical amplifying medium 200 of FIG. 9 is included in a cavity structure for resonating light, an input signal can be outputted after being resonated in the cavity structure, and thus, the optical device according to the present embodiment can be used as a light source that generates a laser. The cavity structure is well known in the art, and thus, its description is omitted.

While the present invention has been shown and described with reference to embodiments thereof, it should not be construed as being limited to such embodiments. One skilled in this art knows, for example, that the structure and constituent elements of FIGS. 1 through 3 and FIG. 9 can be modified and varied in various ways. As a practical example, another earth element can be used as the activator instead of Er, another sensitizer can be used instead of the Si nano-clusters, and the base material of the first and second material layers 10, 10', 20, and 20' can be varied in various ways. Therefore, the scope of the invention is not defined by the detailed description of the invention but by the appended claims.

What is claimed is:

1. An optical amplifying medium comprising at least one multi-layer structure including:

a first material layer doped with an activator, the first material layer does not include a sensitizer;

a second material layer that comprises the sensitizer,
the second material layer stacked on the first material layer,
the second material layer does not include the activator, and a stoichiometry of the second material layer is different than a stoichiometry of the sensitizer.

2. The optical amplifying medium of claim 1, wherein the activator is erbium.

3. The optical amplifying medium of claim 1, wherein the sensitizer is Si nano-clusters.

4. The optical amplifying medium of claim 1, wherein the first material layer is a silicon nitride layer.

5. The optical amplifying medium of claim 4, wherein the second material layer is a silicon oxide layer or a silicon nitride layer.

6. The optical amplifying medium of claim 1, wherein the first material layer is a silicon oxide layer.

7. The optical amplifying medium of claim 6, wherein the second material layer is a silicon nitride layer.

8. The optical amplifying medium of claim 1, wherein the first material layer and the second material layer are alternately and repeatedly stacked.

9. The optical amplifying medium of claim 1, wherein the first material layer and the second material layer respectively have thicknesses of 10 nm or less.

10. A method of manufacturing an optical amplifying medium comprising:
forming a multi-layer structure that comprises a first layer doped with an activator and a second layer having a non-stoichiometric composition on a substrate,
the second layer does not include an activator; and
annealing the multi-layer structure to form a sensitizer in the second layer,
wherein the annealing does not form the sensitizer in the first layer and a stoichiometry of the second layer is different than a stoichiometry of the sensitizer.

11. The method of claim 10, wherein the activator is erbium.

12. The method of claim 10, wherein the sensitizer is Si nano-clusters.

13. The method of claim 10, wherein the first layer is formed of a silicon nitride.

14. The method of claim 13, wherein the second layer is formed of a silicon-rich silicon nitride or a silicon-rich silicon oxide.

15. The method of claim 10, wherein the first layer is formed of a silicon oxide.

16. The method of claim 15, wherein the second layer is formed of a silicon-rich silicon nitride.

17. The method of claim 10, wherein the first layer and the second layer are alternately and repeatedly stacked.

18. The method of claim 10, wherein the first layer and the second layer respectively have thicknesses of 10 nm or less.

19. An optical device comprising: an optical amplifying medium described in claim 1; and
a pumping light source for irradiating pumping light onto the optical amplifying medium.

20. The optical device of claim 19, wherein the optical device is an optical amplifier.

21. The optical device of claim 19, wherein the optical device further comprises a cavity structure for resonating light, and the optical amplifying medium is comprised in the cavity structure.

22. The optical device of claim 21, wherein the optical device is a light source.

* * * * *